United States Patent [19]

Cato et al.

[11] Patent Number: 5,139,747
[45] Date of Patent: Aug. 18, 1992

[54] GAS FILTER-PURIFIER

[75] Inventors: Michael W. Cato, Newark; Scott B. Bassett, San Jose, both of Calif.

[73] Assignee: Semi-gas Systems, Inc., San Jose, Calif.

[21] Appl. No.: 640,642

[22] Filed: Jan. 14, 1991

[51] Int. Cl.⁵ ............................................. B01D 29/39
[52] U.S. Cl. ........................................ 422/122; 55/387; 55/417; 55/418; 55/446; 422/311
[58] Field of Search ................. 55/385.1, 385.6, 387, 55/417, 418, 446, 512; 422/122, 220, 311

[56] References Cited

U.S. PATENT DOCUMENTS

| | | | |
|---|---|---|---|
| 2,430,861 | 11/1947 | Carpenter et al. | 422/122 |
| 3,530,649 | 9/1970 | Porsch et al. | 55/446 |
| 3,572,014 | 3/1971 | Hansen | 55/387 |
| 3,804,942 | 4/1974 | Takashikato et al. | 422/122 |
| 4,133,660 | 1/1979 | Steiner | 55/387 |
| 4,634,458 | 1/1987 | Craig | 55/387 |
| 4,770,317 | 9/1988 | Podgers et al. | 141/86 |

Primary Examiner—Robert J. Warden
Assistant Examiner—Krisanne M. Thornton
Attorney, Agent, or Firm—Thomas E. Schatzel

[57] ABSTRACT

A filter-purifier that removes sub-micron particles as well as trace amounts of moisture, oxygen, and other chemical impurities from a gas stream. The filter-purifier has a pair of end caps, a baffle stack, a purifying medium bed to contain a purifying medium, a pair of face-seal style fittings, a pre-filter cup, a purifying medium retaining screen, a final filter, a pair of spring stacks, a pair of collars to retain the spring stacks, and a cylindrical housing welded between the end caps.

17 Claims, 4 Drawing Sheets

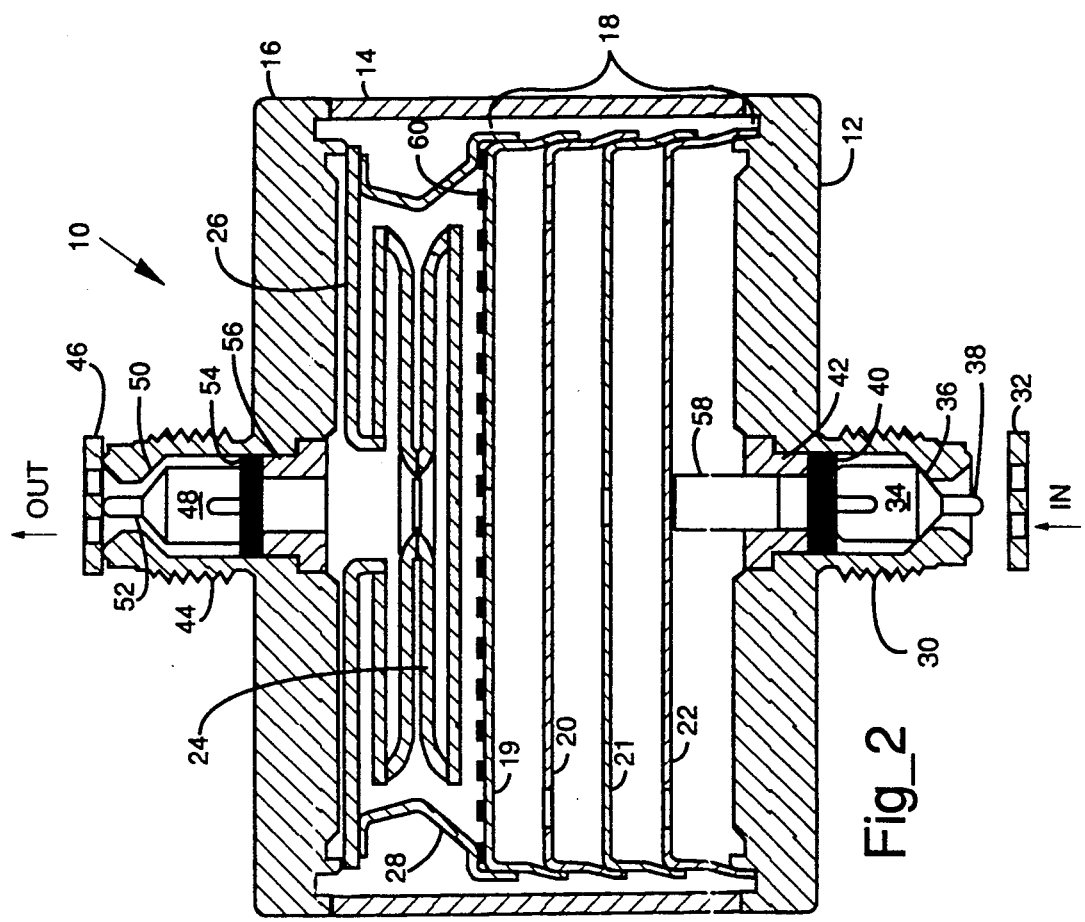
Fig_2
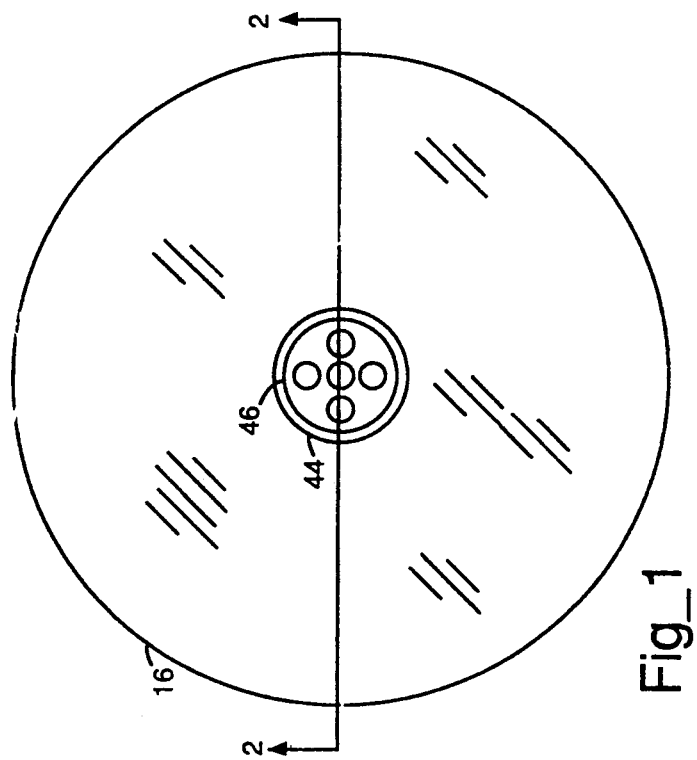
Fig_1

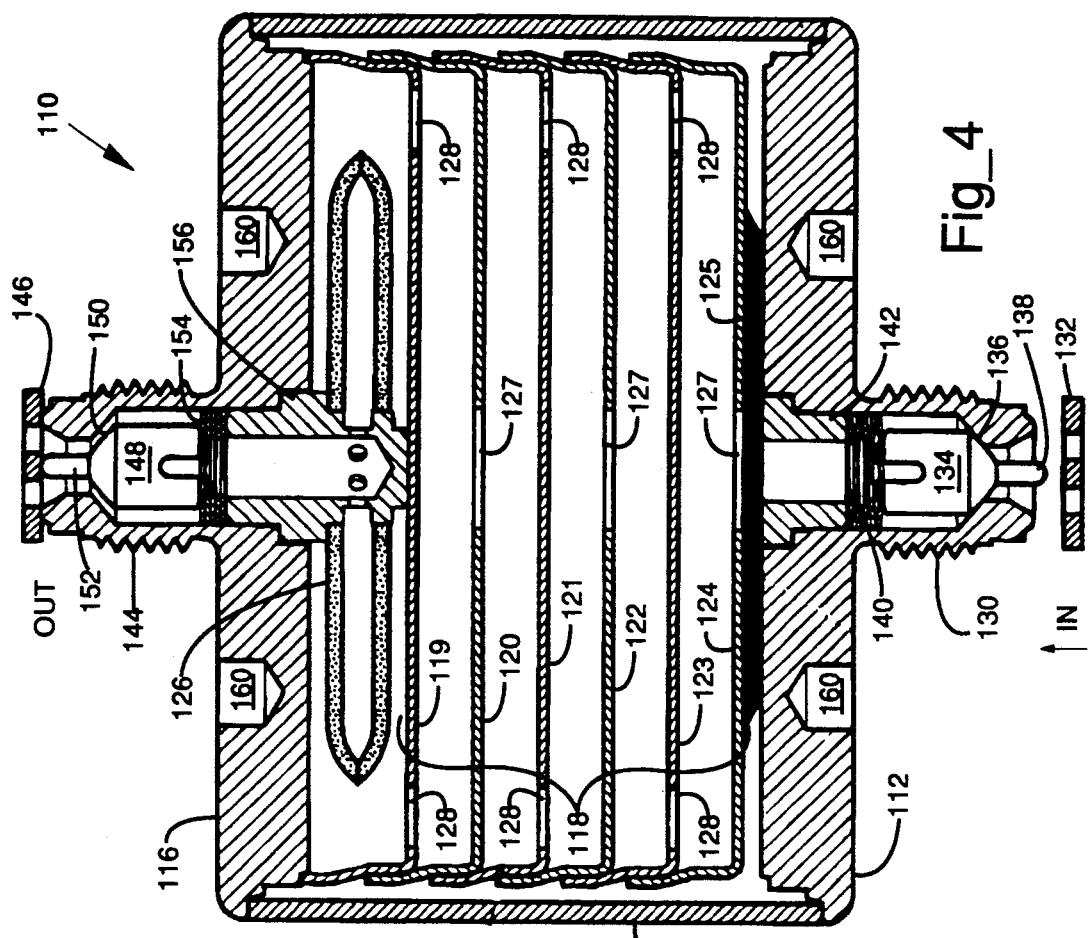
Fig_4
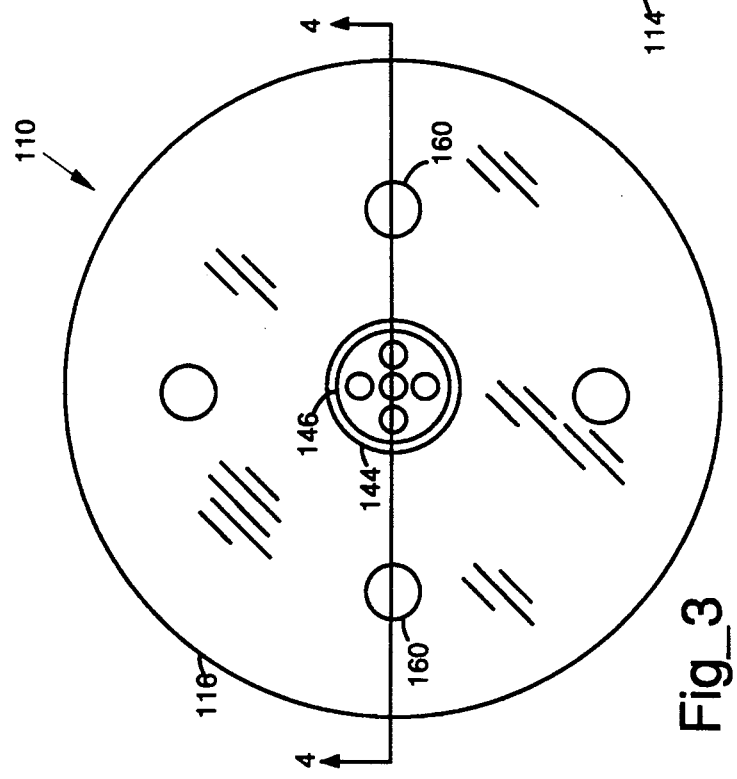
Fig_3

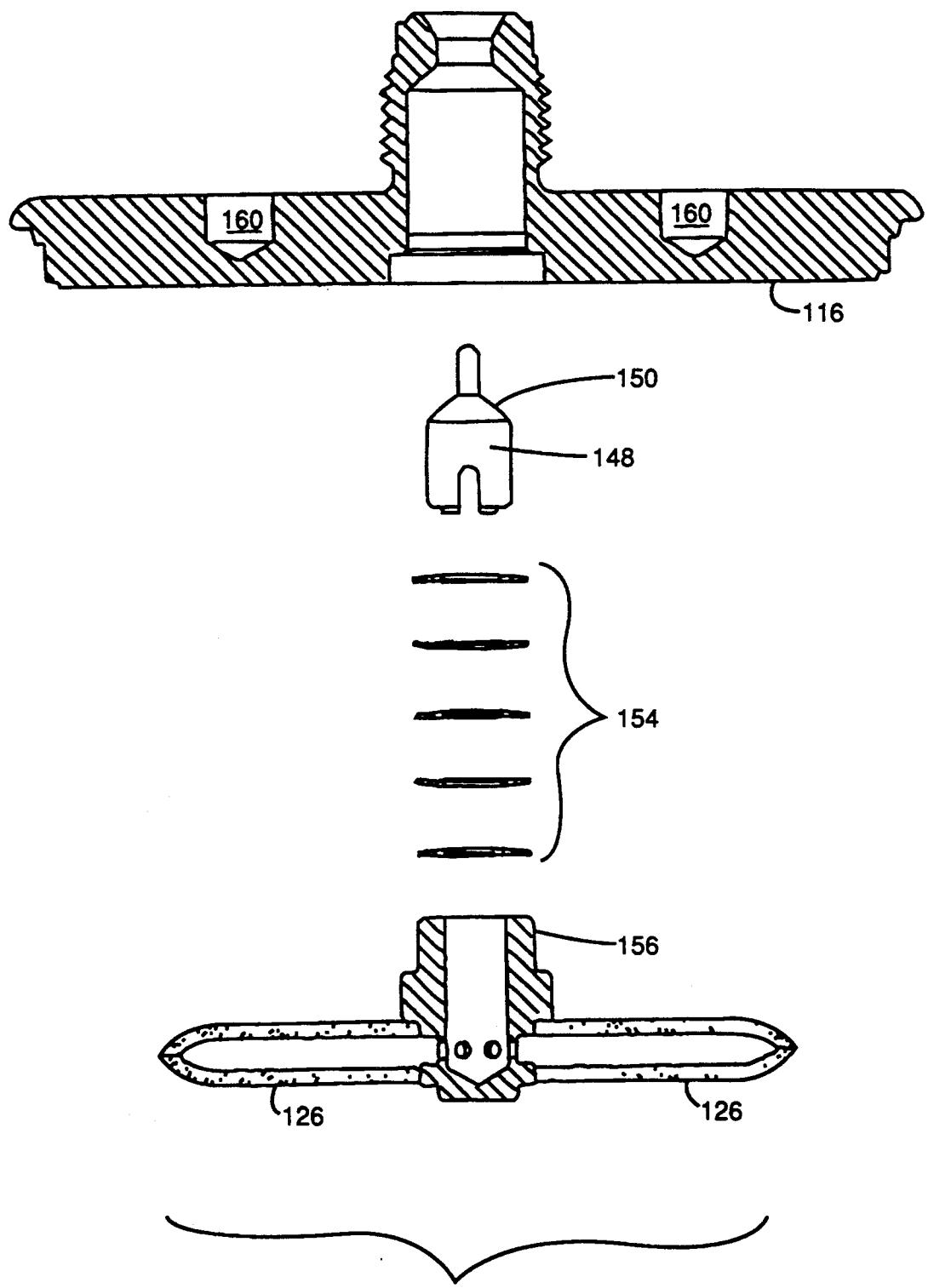
Fig_5

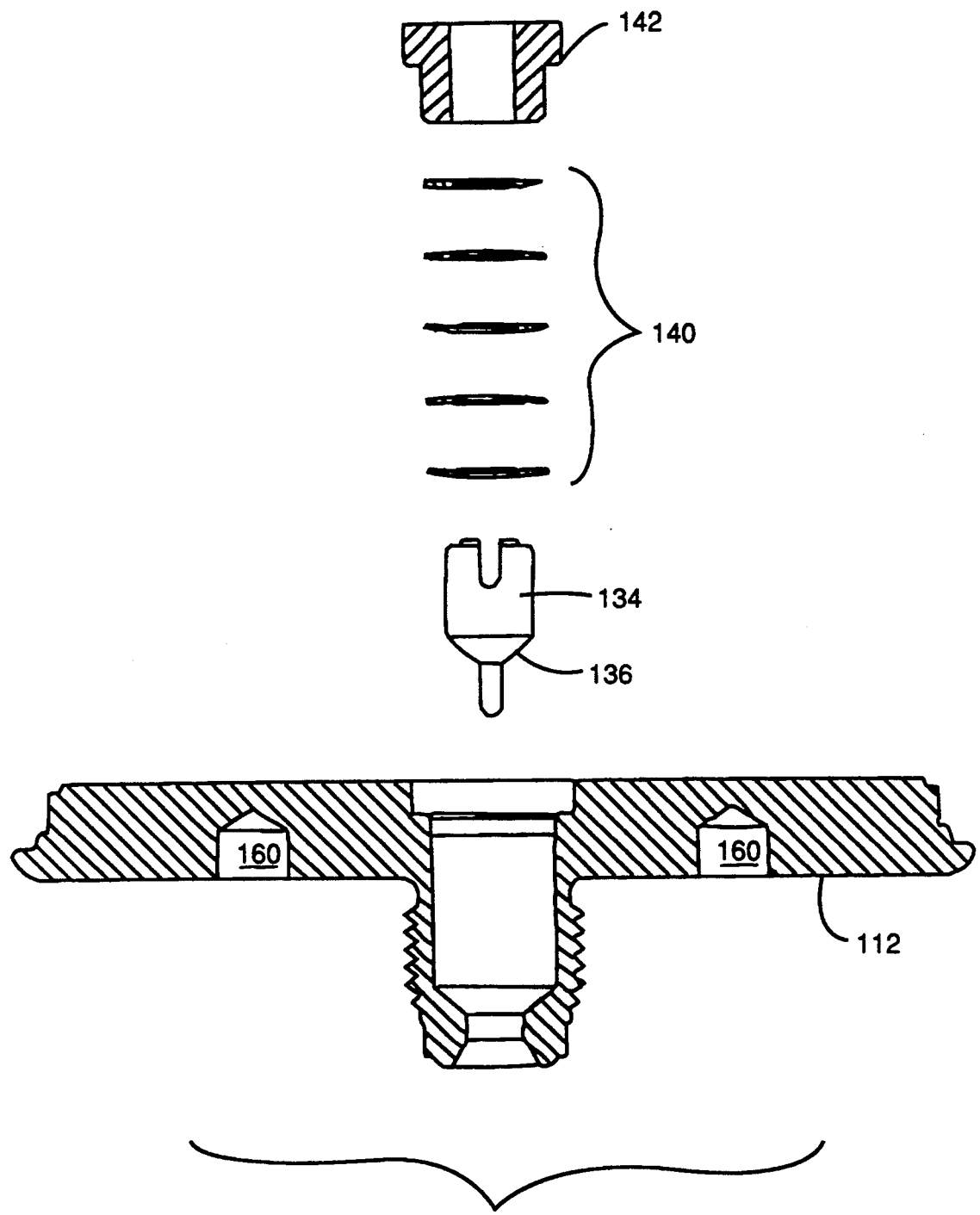
Fig_6

GAS FILTER-PURIFIER

BACKGROUND OF THE INVENTION

1. Field of the Invention

The invention relates generally to gas filters and purifiers and more specifically to devices that remove both particles and chemical impurities from gases used to fabricate integrated circuits in the semiconductor industry.

2. Description of the Prior Art

Semiconductor processing requires the use of a wide variety of gases in the fabrication process. The conductivity of semiconductor materials is controlled by the careful introduction of certain impurities, such as phosphorus and boron. Unwanted impurities, or even the right ones in the wrong amounts, can spoil all the semiconductor wafers subject to the contamination. Semiconductor manufacturers go to great lengths to buy pure silicon ingots, design and operate class 100 and class 10 cleanrooms, and even require wear lint-free "bunny suits" to reduce the risk of contamination.

Gas producers take great care to supply contamination-free gases, but contaminants inevitably creep in. The semiconductor industry therefore customarily uses filters and purifiers at the point-of-use near where the gas is actually used in the process. As such, space is at a premium. Available space is also shrinking with successive generations of equipment as the tools that use them are getting smaller and smaller. Periodic replacement of both filters and purifiers is needed, and this requires that connectors and valves be included and the filters and purifiers located so as to accommodate service. Both the valves and the location needs consume more valuable space.

Several manufacturers worldwide produce a range of purifiers that use various purifying agents internal to the devices. SAES Pure Gas (San Luis Obispo, CA) produces a purifier that uses a gettering alloy that must be heated during regeneration. Japan Pionics, Nippon Sanso, Advanced Technology Materials, Inc. (New Milford, CT), and Ergenics (Wyckoff, NJ) also make commercially available purifiers. Semi-Gas Systems, Inc. (San Jose, CA) produces a line of purifiers that are filled with a highly reactive resin that is commercially marketed as NANOCHEM ® on license from Hercules Corporation. The NANOCHEM resin does not require heating during use and is much less expensive to operate than the types that do require heating. The NANOCHEM, however, must be protected from exposure to air and it is crucial that none of the resin material come close enough to the process of welding a purifier closed to cause the NANOCHEM to melt, because the melting can release enough contaminants to saturate the remaining resin in the purifier.

SUMMARY OF THE PRESENT INVENTION

It is therefore an object of the present invention to provide both filtration and purification in one compact package.

Briefly, a preferred embodiment of the present invention is a filter-purifier that removes particles as well as trace amounts of moisture, oxygen, and other chemical impurities from a gas stream. The filter-purifier comprises a pair of end caps, a baffle stack that contains a purifying medium, a pair of face-seal style fittings, a pre-filter cup, a resin retaining screen, a final filter, a pair of spring stacks, a pair of collars to retain the spring stacks, a pair of sealing poppets, and a cylindrical housing welded between the end caps.

An advantage of the present invention is that it is unique in the regard that it provides both filtration and purification in one compact package. The space needed for a second unit and associated couplings and valves is therefore saved.

Another advantage of the present invention is that a preferred embodiment will dimensionally replace (sealing gland to sealing gland) the industry standard polytetrafluoroethylene (PTFE) membrane filter commonly used in the semiconductor gas handling industry.

These and many other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 1 is an end view of a first embodiment of a filter-purifier of the present invention;

FIG. 2 is a cross-sectional view of the filter-purifier of FIG. 1 taken along the line 2—2;

FIG. 3 is an end view of a second embodiment of a filter-purifier of the present invention;

FIG. 4 is a cross-sectional view of the filter-purifier of FIG. 3 taken along the line 4—4;

FIG. 5 is an assembly diagram of the outlet end cap belonging to the filter-purifier of FIG. 3; and FIG. 6 is an assembly diagram of the inlet end cap belonging to the filter-purifier of FIG. 3.

DETAILED DESCRIPTION OF THE PREFERRED EMBODIMENTS

FIGS. 1 and 2 illustrate a first embodiment of a filter-purifier, referred to by the general reference numeral 10, comprising an inlet endcap 12, a canister tube 14, and an outlet endcap 16. Filter-purifier 10 is preferably three inches in diameter and installed between standard face seal style glands spaced at 3.25 inches. (The adjoining glands must be separable to 3.44 inches to allow easy installation of filter-purifier and gaskets.) No mounting bracket is required. Disposed within canister tube 14 is a baffle stack 18 of a set of four baffles 19–22, a main filter element 24, a filter mounting plate 26, and a compression member 28. Compression member 28 centers the top of stack 18 and compresses it. The compression member 28 is slotted to provide a lower spring rate and to ensure the annular gap between the baffle stack 18 and canister tube 14 is not a virtual leak. The baffles 19–22 consist of four stacked bowls having alternating central and peripheral holes of approximately equal flow area. The baffle design minimizes the space requirement while maximizing the flow path. Baffles 22 and 20 have six peripheral holes that force the gas flow outward through the longest possible flow path. Baffles 19 and 21 have one central hole sized to approximately equal the cumulative flow area of the six peripheral holes. Baffles 20 and 22 preferably have a 0.003 inch PTFE coating that provides a sealing mechanism between the endcap 12, and the other baffles 19 and 21. Sealing of the baffles 19–22 is necessary to prevent partially purified gases from escaping stack 18. Baffles 19–22 are filled with a resin, preferably NANOCHEM ® produced by Hercules, Inc., which forms a resin bed. An inlet nipple 30 contacts a gasket 32. When nipple 30 is coupled to a line, gasket 32 pushes in a poppet 34 away from a sealing surface 36 by virtue of contact with a stem 38. When nipple 30 is disconnected, a spring stack 40 held in by a collar 42 pushes poppet 34 back against its sealing surface 36. Collar 42 is press-fit into endcap 12. Similarly, an outlet nipple 44 contacts a gasket 46. When nipple 44 is coupled to a line, gasket 46 pushes in a poppet 48 away from a sealing surface 50 by virtue of contact with a stem 52. When nipple 44 is disconnected, a spring stack 54, held in by a collar 56, pushes poppet 48 back against its sealing surface 50. Collar 56 is press-fit into endcap 16. A pre-filter cup 58 is screwed into collar 42 and used to trap large incoming particles and isolates the resin bed from the nipple 30. A resin retaining screen 60 is placed next to stack 18 to capture the resin bed (in stack 18) and to allow gases to pass with minimal pressure drop. In FIG. 2, poppet 48 is shown open and away from sealing surface 50, while poppet 34 is shown seated and in contact with sealing surface 36. Three welds are made in the assembly of filter-purifier 10, (a) inlet endcap 12 to canister tube 14, (b) outlet endcap 16 to canister tube 14, and (c) filter mounting plate 26 to outlet endcap 16. Pre-filter cup 58 is preferably made of 316L stainless steel, or HASTELLOY® C-22 produced by Haynes International, Inc. The main filter element 24 is preferably made from a 316L stainless steel, or HASTELLOY C-22, sintered metal belows stack that is welded to a heavy gauge (0.050 inch) plate (filter mounting plate 26). The expanded filter surface area minimizes pressure drop. Filter-purifier 10 is preferably used as a low flow (less than two slpm) final purification and filtration product to be located at the point of use. Typically Ar, He, Kr, Ne, $N_2$, Xe, $NH_3$, $C_4H_{10}$, $CF_4$, $C_2H_6$, $C_2F_6$, $CH_4$, $C_3H_8$, and $H_2$ are processed through filter-purifier 10.

Gas flows through filter-purifier 10 by entering at nipple 30, flowing past open poppet 34, then through center of spring stack 40 and pre-filter cup 58. (Poppet 34 will be open when an inlet line having a semi-toroidal gland seal is connected and tightened to nipple 30.) Gas then leaves pre-filter cup 58 and flows into baffle stack 18 where it must follow a circuitous path between the periphery and center of successive baffles 19-22. Gas flows into the next baffle and then back toward the centerline of the stack 18. The gas must flow outward and inward twice. Gas then flows through the resin retaining screen 60. Main filter element 24 provides filtration to the 0.01 micron level. The gas flows from outside to inside protecting against filter failure caused by expansion. Element 24 is very durable and able to withstand large differential pressures in both directions due to metal construction. The gas then enters spring stack 54, runs past open poppet 48 and out nipple 44. (Poppet 48 will be open when an outlet line having a gland seal is connected and tightened to nipple 44.)

FIGS. 3 and 4 illustrate a second embodiment of a filter-purifier, referred to by the general reference numeral 110, comprising an inlet endcap 112, a canister tube 114, and an outlet endcap 116. Filter-purifier 110 is preferably three inches in diameter and installed between standard face seal style glands spaced at 3.25 inches. (The connecting glands must be separable to 3.44 inches to allow easy installation.) No mounting bracket is required. Disposed within canister tube 114 is a baffle stack 118 comprising a set of six baffles 119-124, a resin retaining screen 125, and a main filter element 126. Baffles 120, 122, and 124 have a central hole 127, and baffles 119, 121, and 123 each have a group of six peripheral holes 128. The six holes 128 on each odd numbered baffle have a combined flow area approximately equal to one hole 127 on each even numbered baffle. The baffle design of filter-purifier 110 has room for two extra baffles because the baffle stack has been reversed, filter element 24 is reduced in size, and compression member 28 is eliminated. Filter-purifier 10 holds approximately 80 ml of a purifying medium. Filter-purifier 110 holds about 100 ml of a purifying medium, e.g., a gettering resin. Baffles 119, 121, and 123 force the gas flow outward, and baffles 120, 122, and 124 each force gas flow inward, thus creating the longest possible path for gas flow through baffle stack 118. Baffles 119-124 are welded together and to endcap 116 before being filled with purifying medium. Baffles 119-124 are preferably filled with a purifying medium sold under the trademark NANOCHEM® by Hercules, Inc. After filling with purifying medium, canister tube 114 is welded to endcap 112 and great care should be exercised in guaranteeing that no purifying medium is trapped or clinging to the outside of baffle 124 or inside canister tube 114 or endcap 112. Any purifying medium that gets close enough to the welding process can melt and contaminate the remaining purifying medium and thus spoil the entire assembly. An inlet nipple 130 contacts and seals to a gland with a gasket 132. When nipple 130 is coupled to a line, gasket 132 pushes in a poppet 134 away from a sealing surface 136 by virtue of contact with a stem 138. When nipple 130 is disconnected, a spring stack 140 held in by a collar 142 pushes poppet 134 back against its sealing surface 136. Spring stack 140 is comprised of five Belleville spring washers. Collar 142 is press-fit into endcap 112 and has a lip that retains purifying medium retaining screen 125 in place. Similarly, an outlet nipple 144 contacts a gasket 146. When nipple 144 is coupled to a line, gasket 146 pushes in a poppet 148 away from a sealing surface 150 by virtue of contact with a stem 152. When nipple 144 is disconnected, a spring stack 154, held in by a filter mounting and retaining collar assembly 156, pushes poppet 148 back against its sealing surface 150. Spring stack 154 is comprised of five Belleville spring washers. Filter mounting and retaining collar assembly 156 is press-fit into endcap 116 and engages at an end opposite to spring stack 154 and baffle 119. Assembly 156 accepts gas flow from outside the upper and lower halves of filter 126 and the gas enters a central chamber through six holes around the circumference of the stem of the assembly and inside the body of filter 126. Assembly 156 is press-fit into endcap 116. Purifying medium retaining screen 125 traps large incoming particles and retains the purifying medium within baffle stack 118. Purifying medium retaining screen 125 preferably has a springy action to it that closes in the area between baffle 124 and end cap 112. In FIG. 4, poppet 148 is shown open and away from sealing surface 150, while poppet 134 is shown seated and in contact with sealing surface 136. Eight welds are made in the assembly of filter-purifier 110, in the following order: (a) baffle 119 to outlet end cap 116, (b) baffle 120 to 119, (c) baffle 121 to 120, (d) baffle 122 to 121, (e) baffle 123 to 122, (f) baffle 124 to 123, (g) canister tube 114 to outlet end cap 116, and after filling with purifying medium, (h) inlet endcap 112 to canister tube 114. The purifying medium is inserted into the interior of the baffle stack 118 by supplying the purifying medium to the central hole 127 in baffle 124 and applying a vacuum of 26 inches of mercury to nipple 144 on the outlet end cap 116. The purifying medium is literally sucked into the baffle stack 118 and will flow through the holes 127 and 128 to form a nicely packed purifying medium bed. A pressure assist from the fill hole side may be required for best results. (Purifying mediums such as NANOCHEM have a consistency of Styrofoam balls the size of grains of sand.) End caps 116 and 112 have a plurality of spanner wrench holes 160 to assist in installation and removal. The purifying medium retaining screen 125 is preferably made of concentrically corrugated 400 or finer mesh screen, 316 stainless steel wire. The main filter element 126 is preferably made from a sintered 316L stainless steel or HASTELLOY ® C-22. The large filter surface area helps to minimize pressure drop. Filter-purifier 110 is preferably used as a low flow (less than two slpm) final purification and filtration product to be located at the point of use. Typically Ar, He, Kr, Ne, N2, Xe, NH3, $C_4H_{10}$, $CF_4$, $C_2H_6$, $CH_4$, $C_3H_8$, and $H_2$ are processed through filter-purifier 110.

Gas flows through filter-purifier 110 by entering at nipple 130, flowing past open poppet 134, then through spring stack 140 and purifying medium retaining screen 125. (Poppet 134 will be open when an inlet line having a gland seal is connected and tightened to nipple 130.) Gas then flows into baffle stack 118 past purifying medium retaining screen 125 where it must follow a circuitous path (to maximize gas-to-purifying medium contact time) between the periphery and center of successive baffles 119–124. Gas flows into the next baffle and then back toward the centerline of baffle stack 118. The gas must flow outward and inward three times through the purifying medium. Gas then flows through main filter element 126, which provides filtration to the 0.01 micron level. The gas flows from outside filter 126 to inside filter 126 to protect against filter failure caused by expansion stresses. Filter element 126 is very durable and able to withstand large differential pressures due to its metal construction. Finally, the gas then enters spring stack 154, runs past open poppet 148 and out nipple 144. (Poppet 148 will be open when an outlet line having a gland seal is connected and tightened to nipple 144.)

FIG. 5 illustrates the assembly of end cap 116. Poppet 148 makes a gas tight seal by virtue of sealing surface 150. Surface 150 is rounded or spherical, rather than a flat cone to ensure a better sealing contact in spite of any minor misalignments of poppet 148 with end cap 116. Spring stack 154 consists of five Belleville spring washers that provide approximately 36 pounds of pressure to poppet 148. Retainer 156 press fits into end cap 116 and filter element 126 attaches to the end of retainer 156.

FIG. 6 illustrates the assembly of end cap 112. Poppet 134 makes a gas tight seal by virtue of sealing surface 136. Surface 136 is rounded or spherical, like sealing surface 150, to ensure a better sealing contact in spite of any minor misalignments of poppet 134 with end cap 112. Spring stack 140 consists of five Belleville spring washers that provide approximately 36 pounds of pressure to poppet 134. Collar 142 press fits into end cap 112.

The second embodiment of the filter-purifier is preferred to the first because cleaner welds can be made throughout and the difficult weld of plate 26 to filter 24 is avoided. Filter-purifier 110 is easier to assemble and the filling of purifying medium into baffle stack 118 is straightforward. No PTFE is required and a better seal between the baffles is realized.

Although the present invention has been described in terms of the presently preferred embodiments, it is to be understood that the disclosure is not to be interpreted as limiting. Various alternations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A filter and purifier in a single unit comprising: a body with inlet and outlet fittings, having;
   means for filtering sub-micron particles; and
   means for chemical purification comprising a plurality of bowl-shaped baffles, each having a base portion and an outwardly projecting wall portion, connected in an interlocking nest, wherein baffle-to-baffle connections are welded.

2. The filter-purifier of claim 1, wherein:
   the distance between the inlet and outlet fittings if 3.25 inches.

3. The filter-purifier of claim 1, wherein:
   the inlet and outlet fittings each comprise a poppet with a stem and a face seal, a spring stack to press said face seal closed, and a collar to retain the spring, wherein when the filter-purifier is not coupled to a gland, the poppets will seal out atmospheric gases.

4. The filter-purifier of claim 1, wherein:
   said means for chemical purification further comprises a purifying medium bed disposed within said interlocking nest.

5. The filter-purifier of claim 1, wherein:
   alternating ones of said baffles have correspondingly alternating inner and outer peripheral holes.

6. A filter-purifier for gases, comprising:
   an inlet poppet assembly having a poppet with a sealing surface, a means for opening said poppet to allow gases to flow past, and a spring means for maintaining a sealing pressure;
   an outlet poppet assembly having a poppet with a sealing surface, a means for opening said poppet to allow gases to flow past, a spring means for maintaining a sealing pressure, and a poppet retainer;
   a purifying medium bed disposed between a plurality of bowl-shaped baffles, each having a base portion and an outwardly projecting wall portion, connected in an interlocking nest, wherein baffle to baffle connections are welded and wherein said nest lengthens the path that a gas flow through the purifying medium bed, must take;
   a filter element to trap particles carried in said gas flow, the filter element disposed between the purifying medium bed and the outlet poppet assembly; and
   a single gas tight housing assembly able to contain the inlet and outlet poppet assemblies, the purifying medium bed, and the filter element.

7. The filter-purifier of claim 6, wherein:
   the inlet poppet assembly makes a gas tight seal automatically when the inlet of the filter-purifier is disconnected from an inlet line, such that the purifying medium bed is protected from exposure to the atmosphere.

8. The filter-purifier of claim 6, wherein:

the outlet poppet assembly makes a gas tight seal automatically when the outlet of the filter-purifier is disconnected from an outlet line, such that the purifying medium bed is protected from exposure to the atmosphere.

9. The filter-purifier of claim 6, wherein:

the nest of bowl-shaped baffles contains holes that alternate from the center of one baffle to near the perimeter of the next baffle to lengthen the path of the gas flow.

10. The filter-purifier of claim 9, wherein:

the purifying medium bed comprises six baffles that will hold approximately 100 milliliters of purifying medium.

11. The filter-purifier of claim 6, wherein:

said purifying medium is a purifying medium that functions at room temperature.

12. The filter-purifier of claim 6, wherein:

the purifying medium bed comprises a purifying medium retaining screen to retain said purifying medium after filling of the purifying medium bed with purifying medium.

13. The filter-purifier of claim 6, wherein:

the filter element is constructed such that purifying medium is blocked from escaping the purifying medium bed and such that the purifying medium does not clog the filter element.

14. The filter-purifier of claim 1, wherein:

said baffle wall projections project towards said inlet.

15. The filter-purifier of claim 1, wherein:

said baffle wall projections project towards said outlet.

16. The filter-purifier of claim 6, wherein:

said baffle wall projections project towards said inlet.

17. The filter-purifier of claim 6, wherein:

said baffle wall projections project towards said outlet.

* * * * *